United States Patent [19]

Phillips et al.

[11] 4,047,185

[45] Sept. 6, 1977

[54] MULTI-JET INK PRINTER USING STAR-WHEEL JET FORMERS

[75] Inventors: Edwin R. Phillips, Rosemont; Raymond J. Stankiewicz, Philadelphia, both of Pa.

[73] Assignee: Sperry Rand Corporation, New York, N.Y.

[21] Appl. No.: 673,032

[22] Filed: Apr. 2, 1976

[51] Int. Cl.² .............................................. G01G 15/16

[52] U.S. Cl. ........................ 346/140 R; 101/DIG. 13; 118/659; 346/153

[58] Field of Search ..................... 346/140 R, 75, 153, 346/159; 101/DIG. 13; 118/621, 624–627, 638, 659, 651, 647

[56] References Cited

U.S. PATENT DOCUMENTS

| | | | |
|---|---|---|---|
| 3,052,213 | 9/1962 | Schaffert | 118/659 X |
| 3,330,683 | 7/1967 | Simm | 118/647 X |
| 3,341,859 | 9/1967 | Adams | 346/140 |
| 3,375,528 | 3/1968 | Klausons | 346/140 |

OTHER PUBLICATIONS

Damm, E. P.; A Self-Fixing Ink For Non-Mechanical Printing; IBM Tech. Disc. Bulletin, vol. 3, No. 9, Feb. 1961, p. 8.

*Primary Examiner*—Joseph W. Hartary
*Attorney, Agent, or Firm*—Eugene T. Battjer; Sheldon Kapustin

[57] ABSTRACT

A multi-jet ink printer comprises a drum having rows of pointed jet formers, or prongs, mounted about its outside surface. The drum is successively rotated such that the tips of the prongs are dipped into a reservoir of ink and thereafter pointed toward a recording carrier, such as paper. When the prongs are directed toward the carrier, an electrostatic field is established between the drum and electrodes located on the opposite side of the carrier. The ink is thereby caused to leave the sharp points and form ink jets composed of very small droplets of ink. The ink is thereby deposited on the carrier. There is an electrode located opposite each prong which is selectively energized to produce dots on the carrier when the prong is in selected positions relative to the carrier. In this respect, the drum is moved axially (horizontally) to scan rows on the carrier, and the carrier is moved longitudinally (vertically) to scan vertically on the carrier.

11 Claims, 4 Drawing Figures

FIG. 2
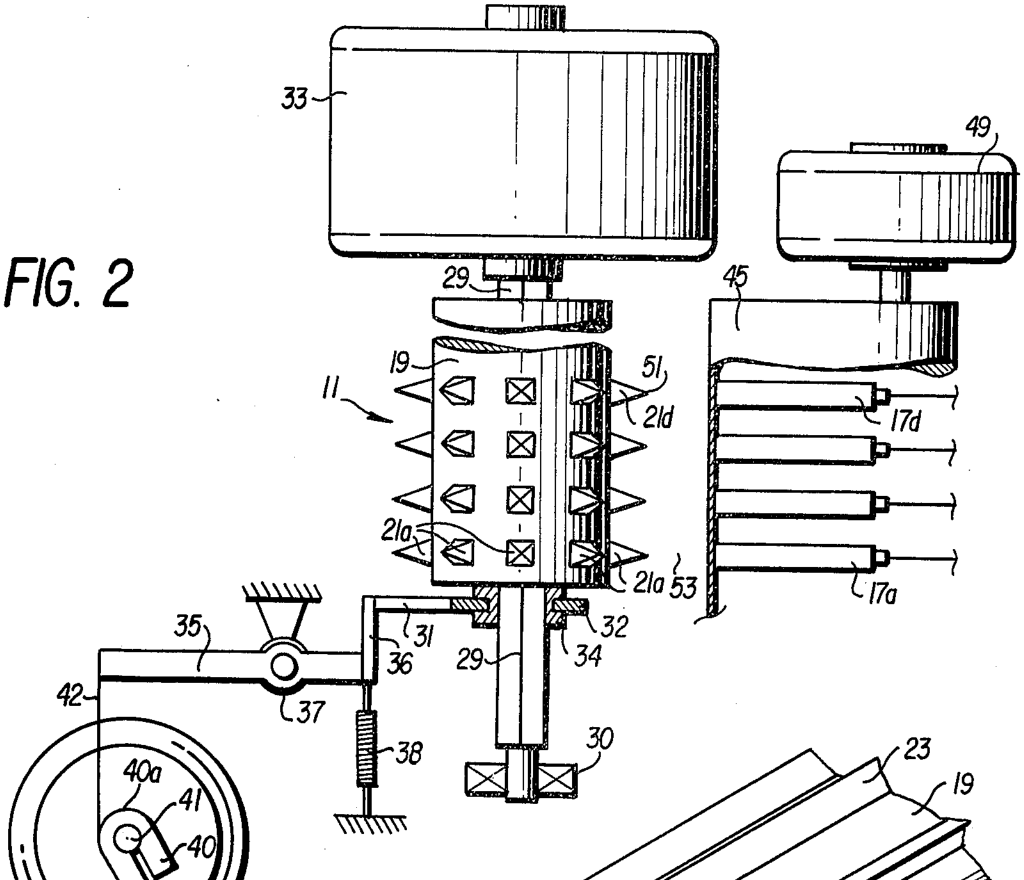
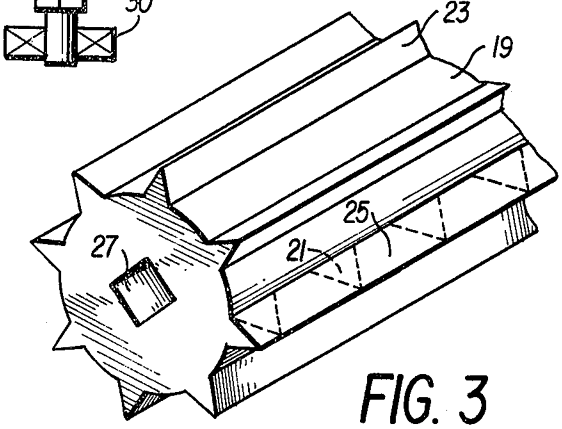
FIG. 3
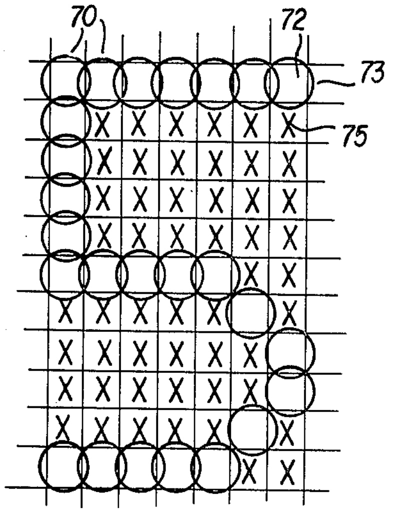
FIG. 4

MULTI-JET INK PRINTER USING STAR-WHEEL JET FORMERS

BACKGROUND OF THE INVENTION

This invention relates generally to the art of electrostatic printers, and more particularly to those such printers in which an electrostatic field is used to create an ink jet from a print head to a recording carrier.

The concept of generating ink jets using a strong electrostatic field is well known in the art. However, in most jet-type electrostatic printers, there are nozzles located at print heads which dispense the ink for forming jets. Examples of such devices are found in U.S. Pat. Nos. 3,060,429 to Winston, 3,585,060 to Gourdine et al., 3,579,245 to Berry, 3,916,421 to Hertz, and 3,914,772 to Kashio. A problem with these devices is that the nozzles thereof tend to clog with contaminants. A related problem is that the ink must be maintained as contamination free as possible to avoid clogging; thus, increasing the cost of operation. Therefore, it is an object of this invention to provide a ink-jet printer in which the jet-forming elements are immuned to clogging.

It is a further object of this invention to provide such a printer which is uncomplicated and relatively inexpensive to manufacture and operate.

There are a number of U.S. Patents disclosing devices which include matrices of selectively-energized printing elements for printing overlapping dots to form lines. Such patents include U.S. Pat. Nos. 3,052,213 to Schaffert, 3,750,564 to Bettin, 3,834,301 to Croquelois et al., 3,900,094 to Larsen et al., and 3,913,719 to Frey. In addition, the jet printer disclosed in the Hertz patent mentioned above (U.S. Pat. No. 3,916,421) also discloses a matrix used for printing. The devices mentioned in these patents are related to the present invention in that many of the control circuits therein could be used in the present invention, and, in particular, the control circuit of Frey (3,913,719) is hereby incorporated into this patent by reference.

SUMMARY

According to principles of this invention, an apparatus and method for producing imprints on a recording carrier involves dipping a pointed tip of an elongated prong into a body of ink, directing the pointed tip of the prong toward the receiving carrier, and establishing an electrostatic field between the elongated prong and the recording carrier. A jet of ink is thereby caused to flow from the pointed prong to the carrier.

The structure for providing this effect includes a drum having rows of pointed prongs positioned about its periphery. The drum is rotated to sequentially dip rows of the prongs into ink held in an ink reservoir and thereafter point the prongs toward the carrier. There are a plurality of electrodes positioned behind the carrier, or web, with one electrode being adjacent to each of the prongs. The drum is moved axially, or horizontally, in small increments or steps. At each step selected ones of the electrodes are energized. Thus, each prong creates a row of dots, the completeness of which is determined by how many steps its corresponding electrode is energized. The carrier is then indexed one row and the drum is again stepped horizontally to create second rows of dots below the first rows. The rows of dots respectively add together to form characters. Each of the pointed prongs thusly imprints a character along a horizontal print line. The drum is then rotated one increment to bring a new row of prongs into the print position, and to dip another row of prongs into the ink reservoir, and the carrier is indexed to a new print line.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a top-view of a portion of the printing apparatus of FIG. 1;

FIG. 3 is an isometric view of the printing head of the printing apparatus of FIGS. 1 and 2 shown during a stage of its manufacture; and FIG. 4 is a diagrammatic drawing illustrating the manner in which the apparatus of FIGS. 1 through 3 forms characters.

Figure 1:
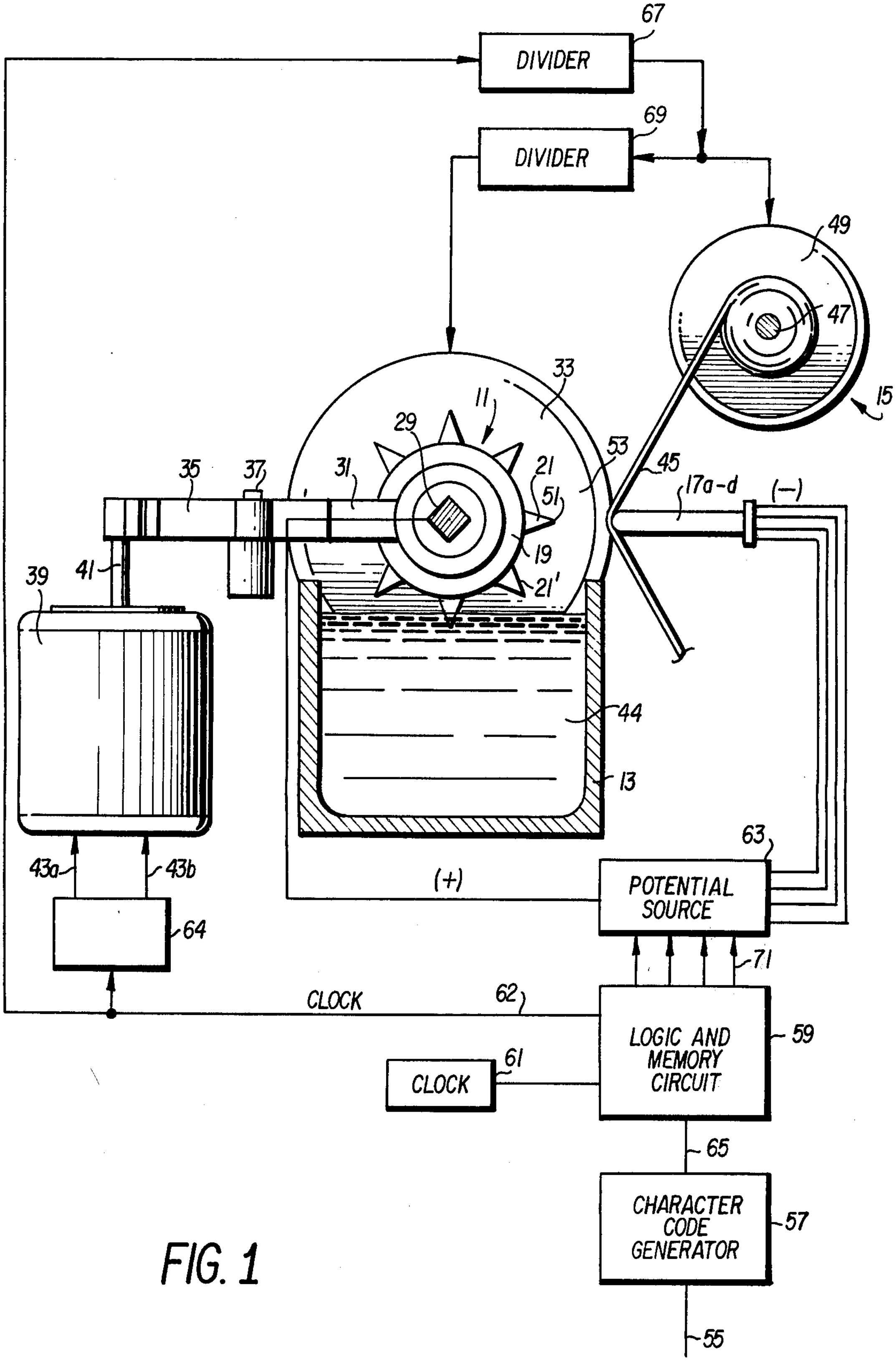
FIG. 1 is a partially schematic and partially block side-view of a printing apparatus employing principles of this invention.

The printing apparatus depicted in FIGS. 1 and 2 includes a print wheel or head 11, an ink reservoir 13, a paper support system 15, individual electrodes 17*a–d*, and the other elements incident to, and supportive of, these elements.

The print wheel or head 11 is basically a metallic drum 19 upon which has been machined equally-spaced angularly-disposed rows of protruding, pyramidal-shaped, pointed prongs 21*a–d*. FIG. 3 depicts one manner in which the pointed prongs 21 may be formed. First, a series of sharp protruding radial knives 23 are "turned" on the drum and thereafter the knives are "machined" by grinding away portions 25 to form the protruding pyramids or prongs 21. Corresponding prongs of separate rows lie in planes perpendicular to the axis of the drum 19, such as the prongs 21*a* in FIG. 2.

It should be noted that the metallic drum 19 has a rectangularly-shaped axial passage 27 which is slidably mounted on a rectangularly-shaped axial shaft 29. The axial shaft 29 is supported for rotation at one end by a frame supported bearing 30 and is driven at its opposite end by a rotating stepping motor 33. An arm 31 rides in an annular groove 32 of an extension 34 (not shown in FIG. 3) of the drum 19. A link 36 connects the arm 31 to a lever 35 which is pivotally supported on a frame-mounted stationary pin 37. The lever 35 is biased by a spring 38 to rotate in a clockwise direction as viewed in FIG. 2, but is driven to oscillate about the pin 37 by a reversing stepping motor 39 via a flexible connection 42 and a contoured clamp 40. The contoured clamp 40 is fixedly mounted on the shaft 41 of the stepping motor 39 so that when the shaft 41 turns it either winds or unwinds the flexible connection 42 about its contoured surface 40*a*. The stepping motor 39 rotates in steps and this rotational movement is translated to axial motion of the print-head drum 19 by the lever 35 and the link 36. In this manner, the drum 19 is driven first in one direction and then in the opposite direction by the stepping motor 39. In the preferred embodiment, the stepping motor 39 is a reversing motor and can be stepped in either direction. This is a standard option on nearly all stepping motors and it is not thought necessary to explain this feature further here. In the preferred embodiment the reversing motor has two power input terminals 43*a* and *b;* pulses to one terminal cause the motor to step in one direction, pulses to the other produce opposite rotation. The motor has a fixed angular displacement per pulse.

The spring 38 could be eliminated if the flexible connection 42 can transmit forces to the drum 19 without buckling.

The ink reservoir 13 contains ink 44 and is positioned below the metallic drum 19 such that as the metallic drum 19 is rotated about its axis, its rows of prongs 21 successively extend into the ink 44 and pick up small amounts thereof on their surfaces.

The paper support system 15 comprises a paper supply (not shown) from which a web 45 is drawn. The web 45 is rolled onto a reel 47 which is driven by a paper-supply stepping motor 49. It should be noted, that the web is positioned relatively close to outer tips 51 of the pointed prongs 21 at a printing station 53.

The electrodes 17*a–d* are positioned at the printing station 53 on the opposite side of the web 45 from the pointed prongs 21. There is an electrode 17 opposite each of the pointed prongs 21. For example, electrode 17*a* is opposite the pointed prong 21*a* (FIG. 2). Each time the metallic drum 19 is rotated one increment about its axis, a new row of pointed prongs is positioned at the printing station 53 beside the electrode 17*a–d* to take the position of the previous row. For example, with reference to FIG. 1, once the metallic drum 19 is rotated one increment, the pointed prongs 21 will be replaced by pointed prongs 21′ at the printing station 53.

The logic and control circuit is similar to the logic and control circuit for U.S. Pat. No. 3,913,719 to Frey so it will be described with occasional reference to the Frey patent. Broadly, an input 55 is converted into a code by a character code generator 57 which is, in turn, processed by a logic and memory circuit 59. The logic and memory circuit 59 is clocked by a clock 61 and drives the drum-rotating stepping motor 33, the drum-oscillating stepping motor 39, and the paper-supply stepping motor 49, as well as a potential source 63 to selectively energize the electrodes 17*a–d.*

The input 55 could be from a typewriter, keyboard, tape, magnetic card, or the like. The character code generator 57 produces character code pulses on a line 65 representative of the input data 55 similar to the character code pulses on line 97 in the Frey patent. These pulses are loaded into registers (not shown) of the logic memory circuit 59 similar to registers 60 in the Frey patent. In due course, as is explained below, the logic and memory circuit 59 produces voltage potentials on selective ones of the electrodes 17*a–d* relative to the drum 19. It is noted that when the electrodes 17*a–d* are energized by the operating potential source 63, an electrostatic field exists between the electrodes and drum 19. The potentials produced on the electrodes 17*a–d* are similar to the electrical signals placed on leads 73 in Frey.

The manner in which clock signals from the clock 61 are used to drive the logic and memory circuit 59 are fully explained in Frey and are, therefore, not gone into in greater detail here. However, the clock signals are further used by the logic and memory circuit to drive the drum-rotating stepping motor 33, the drum-oscillating stepping motor 39, and the paper-supply stepping motor 49. In this respect, at appropriate times, the clock pulses, or derivatives therefrom are fed from the logic and memory circuit 59 on a line 62 directly to the drum-oscillating stepping motor 39 to continually move the metallic drum 19 in axial (horizontal) incremental steps. The metallic drum 19 is driven first in one direction and then in the opposite direction. The stepping motor 39 steps in synchronization with the application of potentials to the electrodes 17*a–d* by the logic and memory circuit 59. In this respect, clock pulses are alternately fed to the terminals 43*a* and *b* of the stepping motor 39 in groups of seven (7) pulses by a down-up-down counter 64; thus, the stepping motor 39 first drives the metallic drum 19 to seven (7) discrete locations in one direction and then the motor reverses and drives the drum 19 again seven (7) steps in the opposite direction to the original or home position. It should be understood that any number of steps, not necessarily seven (7), can be programmed depending on the type of matrix desired (matrix described in more detail below).

The clock pulses on line 62 are also supplied via a divider 67 to the paper-supply stepping motor 49. In this respect, the divider 67 divides by seven (7) so that the paper-supply stepping motor 49 receives one pulse for each seven (7) pulses received by the oscillating stepping motor 39. Further, the divider 67 is coordinated with the reversing mechanical linkage 40 such that the pulses expelled by the divider 67 occur just before the motion of the metallic drum 19 reverses its direction. Thus, the web 45 is rotated one increment about the reel 47 by the paper-supply stepping motor 49 immediately before the pointed prongs 21 begin scanning in an opposite direction.

Finally, the clock signals, or derivatives thereof appearing on line 62 are applied via the divider 67 and another divider 69 to the drum-rotating stepping motor 33. The divider 69 is sized to provide a pulse to the rotating stepping motor 33 each time a print line of characters (for example a line of text) has been completed on the web 45. Thus, a new row of pointed prongs 21 having a fresh supply of ink thereon will be positioned opposite the electrodes 17*a–d* each time a new print line of characters (a line of text) is commenced. Although there are only four (4) pointed prongs 21*a–d* and four (4) electrodes 17*a –d* shown in each row it should be understood that there can be as many of these elements as is desired and, in fact, in a preferred embodiment there are sufficient numbers of these elements to simultaneously form all of the characters in a complete print line or line of text.

In operation, input data 55 is fed into the character code generator 57 which feeds encoded data along line 65 to the logic and memory circuit 59. The logic and memory circuit 59, via the stepping motors 33, 39 and 49, along with associated circuitry as is described above, drives the drum 19 to reciprocate back and forth axially, or horizontally, in seven step increments on the rectangularly shaped axial shaft 29; drives the web 45 to move one increment longitudinally (vertically) for each seven step axial translation of the metalic drum 19; and rotates the metallic drum 19 one increment each time a print line of characters, or line of text, has been completed on the web 45. Simultaneously therewith, the logic and memory circuit 59 drives the operating potential source 63 via lines 71 to selectively place minus potentials, relative to the metallic drum 19, on the electrodes 17. Each time a potential is placed on an electrode, the electrode attracts a jet of ink from its respective pointed prong 21 to create a dot on the web 45. The dots overlap to form lines.

With reference to FIG. 4, a single printed character of print line comprises overlapping dots 72. A character matrix includes seven matrix columns 70 (one for each translation step) and eleven matrix rows 73. A series of these matrices side-by-side form a print line. The X's 75 shown in FIG. 4 signify those prong positions at which a corresponding electrode 17 was not energized by the logic and memory circuit 59 to create dots 72. In FIG. 4, a character is printed on eleven matrix rows 73, although other numbers of rows are also possible. Spacing is obtained between characters on adjacent print lines by simply not energizing the electrodes 17 when the prongs at the print station 53 are positioned between the print lines on the web 45. The paper-supply stepping motor 49 is allowed to increment several times between print lines before the electrodes 17 are again energized to produce printing. It would also be possible to program the device to increment the paper-supply stepping motor 49 abnormally fast between print lines.

Thus, during the printing of a print line, the web 45 is advanced one matrix row 73 of the character matrices at a time until all necessary dots on the matrices have been printed to form a print line of characters. Each prong 21 in a prong row will print one character. All prongs in a row will simultaneously scan their particular character matrices and print or not print in each position.

It will be appreciated by those skilled in the art that the method and apparatus of printing described herein provides relatively clog-free jet-type printing in contrast to the nozzle systems of the prior art. In addition, the apparatus of this invention is relatively uncomplicated and inexpensive to manufacture.

While the invention has been particularly shown and described with reference to a preferred embodiment, it will be understood by those skilled in the art that various changes in form and detail may be made therein without departing from the spirit and scope of the invention. For example, the number of pointed prongs 21 on the metallic drum 19 could vary considerably as could the number of steps through which the pointed prongs are moved both vertically and horizontally.

The embodiments of the invention in which an exclusive property or privilege are claimed are defined as follows:

1. Apparatus for producing imprints of selective shapes on a recording carrier comprising:

a recording-carrier support means for supporting a recording carrier;

a printing-head means comprising at least one protruding prong having a pointed tip adapted to be directed toward said recording carrier, said at least one protruding prong having a pyramidal shape;

an ink reservoir positioned adjacent to said printing-head means for holding ink;

a resupply means for dipping the pointed tip of said at least one protruding prong into ink held by said ink reservoir and thereafter directing said pointed tip toward said recording carrier; and an electrostatic-field means for selectively establishing an electrostatic field between said printing head and said recording carrier during printing modes of operation.

2. Apparatus as in claim 1 wherein is further included a position-control means for controlling the position of said at least one pyramidal-shaped protruding prong relative to said recording-carrier during successive printing modes of operation.

3. Apparatus as in claim 2 wherein said printing-head means comprises a drum having a plurality of pointed pyramidal-shaped prongs extending radially therefrom and positioned at angular increments therearound on a plane perpendicular to the drum's axis.

4. Apparatus as in claim 3 wherein said electrostatic-field means includes at least one electrode positioned on one opposite side of said recording carrier from said printing-head means, but adjacent to said plane of protruding prongs, and a means for applying a potential between said drum and said electrode.

5. Apparatus for producing imprints of selective shapes on a recording carrier comprising:

a recording-carrier support means for supporting a recording carrier;

a printing-head means comprising a drum having a plurality of pointed prongs extending radially therefrom and positioned at angular increments therearound on planes perpendicular to the drum's axis, said pointed prongs to be directed toward said recording carrier, there being a row of pointed prongs at each angular position about said drum, said row of pointed prongs at each angular position forming a line substantially parallel to the axis of said drum;

an ink reservoir positioned adjacent to said printing-head means for holding ink;

a resupply means for dipping the pointed tips of said protruding prongs into ink held by said ink reservoir and thereafter directing said pointed tips toward said recording carrier;

a position-control means for controlling the position of said drum relative to said recording-carrier during successive printing-modes of operation; and an electrostatic-field means for selectively establishing an electrostatic field between said printing head and said recording carrier during printing modes of operation, said electrostatic field means including a plurality of electrodes each positioned on an opposite side of said recording carrier from said printing head means adjacent to a corresponding one of said planes of protruding prongs, and a means for applying a potential between said drum and said electrodes.

6. Apparatus as in claim 5 wherein said drum includes a means for periodically rotating said drum to direct successive rows of prongs toward said recording carrier during successive modes of operation and to simultaneously dip other rows of prongs into said ink.

7. Apparatus for producing imprints of selective shapes on a recording carrier comprising:

a recording-carrier support means for supporting a recording carrier;

a printing-head means comprising a drum having a plurality of pointed prongs extending radially therefrom and positioned at angular increments therearound on a plane perpendicular to the drum's axis, said pointed prongs to be directed toward said recording carrier;

an ink reservoir positioned adjacent to said printing-head means for holding ink;

a resupply means for dipping the pointed tips of said protruding prongs into ink held by said ink reservoir and thereafter directing said pointed tips toward said recording carrier;

a position-control means for controlling the position of said drum relative to said recording-carrier during successive printing-modes of operation, said position control means including a recording carrier drive means for moving said recording carrier longitudinally and a drum reciprocating means to move said drum axially, in a direction 90° from said longitudinal direction; and an electrostatic-field means for selectively establishing an electrostatic field between said printing head and said recording carrier during printing modes of operation, said electrostatic field means including at least one electrode positioned on an opposite side of said recording carrier from said printing head means adjacent to the plane of protruding prongs, and a means for applying a potential between said drum and said electrode.

8. Apparatus as in claim 7 wherein said electrostatic-field means coordinates establishment of said electrostatic field with the movement of said drum by said position-control means.

9. Apparatus as in claim 7 wherein said position-control means comprises stepping motors for reciprocating said drum, and for moving said recording carrier.

10. A method of producing imprints of selected shapes on a recording carrier comprising the steps of:

dipping the pointed tips of elongated prongs into a body of ink by rotating a drum having rows of elongated prongs protruding therefrom above a container full of ink so that the rows of prongs successively dip into the ink;

directing the pointed tips of an entire row of the drum-mounted prongs toward the recording carrier, moving the drum axially and moving the recording carrier in a direction 90° from the axial direction; and establishing an electrostatic field between said elongated prongs and said recording carrier.

11. A method as in claim 10 wherein the step of establishing an electrostatic field between said elongated prongs and said recording carrier comprises the substeps of establishing said field when said drum is in a first position, eliminating said field when said drum is being moved, and reestablishing said field when said drum is in a stationary position.

* * * * *